(12) United States Patent
Hikmet et al.

(10) Patent No.: US 8,662,672 B2
(45) Date of Patent: Mar. 4, 2014

(54) LIGHTING DEVICE, ARRAY OF LIGHTING DEVICES AND OPTICAL PROJECTION DEVICE

(75) Inventors: Rifat Ata Mustafa Hikmet, Eindhoven (NL); Abraham Rudolf Balkenende, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 641 days.

(21) Appl. No.: 12/681,131

(22) PCT Filed: Oct. 3, 2008

(86) PCT No.: PCT/IB2008/054054
§ 371 (c)(1),
(2), (4) Date: Apr. 1, 2010

(87) PCT Pub. No.: WO2009/047683
PCT Pub. Date: Apr. 16, 2009

(65) Prior Publication Data
US 2010/0231863 A1 Sep. 16, 2010

(30) Foreign Application Priority Data
Oct. 8, 2007 (EP) .................................. 07118027

(51) Int. Cl.
*G03B 21/00* (2006.01)
(52) U.S. Cl.
USPC ............................................. 353/31; 362/83
(58) Field of Classification Search
USPC .................. 353/31; 349/121; 358/61; 362/83
See application file for complete search history.

(56) References Cited

U.S. PATENT DOCUMENTS

| 6,327,074 | B1 | 12/2001 | Bass et al. |
| 6,406,148 | B1* | 6/2002 | Marshall et al. ................. 353/31 |
| 6,979,499 | B2* | 12/2005 | Walck et al. .................. 428/690 |
| 7,088,040 | B1 | 8/2006 | Ducharme et al. |
| 7,474,286 | B2* | 1/2009 | Hajjar et al. ..................... 345/81 |
| 2004/0232826 | A1 | 11/2004 | Liu et al. |
| 2004/0239894 | A1 | 12/2004 | Shimada |
| 2006/0044514 | A1* | 3/2006 | Ushigome ........................ 353/20 |
| 2007/0014318 | A1* | 1/2007 | Hajjar et al. ...................... 372/9 |
| 2007/0019408 | A1* | 1/2007 | McGuire et al. .............. 362/231 |
| 2007/0228927 | A1* | 10/2007 | Kindler et al. ................ 313/495 |

FOREIGN PATENT DOCUMENTS

EP 1795798 A1 6/2007

* cited by examiner

*Primary Examiner* — Francis M Legasse, Jr.
*Assistant Examiner* — Jerry Brooks
(74) *Attorney, Agent, or Firm* — Kenneth Springer; Mark Beloborodov

(57) ABSTRACT

The invention relates to a lighting device (1), an array of such lighting devices and an optical projection device comprising such lighting device. The lighting device, comprises at least one laser source (4) for generating laser radiation, wherein the laser source is optically coupled to an optical element (7, 8, 9) comprising at least one luminescent material, suitable for emitting luminescent radiation upon laser excitation by the laser radiation, wherein the optical element is provided with at least one reflector for directing the radiation from the luminescent dot through an emission window of the optical element. The lighting device is particularly useful in a projector and other lighting applications.

20 Claims, 8 Drawing Sheets

LIGHTING DEVICE, ARRAY OF LIGHTING DEVICES AND OPTICAL PROJECTION DEVICE

FIELD OF THE INVENTION

The invention relates to a lighting device, an array of such lighting devices and an optical projection device comprising such lighting device.

BACKGROUND OF THE INVENTION

Many lighting systems, in particular projectors, typically use discharge lamps as a light source. Recently, some manufacturers have introduced projection systems using LED technology. Such projectors use a combination of red, blue and green LEDs that are combined and projected through an optical system. However, known systems are bulky due to the optical system, and need extensive cooling.

It is an object of the invention to provide an improved optical projection and illumination system. In particular, it is an aim of the invention to provide a compact lighting device capable of a high energy density.

SUMMARY OF THE INVENTION

The invention provides a lighting device, comprising at least one laser source for generating laser radiation, wherein the laser source is optically coupled to an optical element comprising at least one luminescent material suitable for emitting luminescent radiation upon laser excitation by the laser radiation, wherein the optical element is provided with at least one reflector for directing the emitted radiation from the luminescent material through an emission window of the optical element. Such a system enables a very compact lighting device producing light of a high energy density, that also allows for a relatively easy heat-management. The device according to the invention provides light with a high energy density (energy density=Intensity/surface integrated over a solid angle) in particular a high intensity emission from small surface area and the light emission confined to as small angular range. The other aspect of the invention is to use such a light source in a projector for obtaining a compact system. The laser source can be any known laser source, preferably semiconductor diode lasers. The laser source is preferably arranged to produce a pulsed laser emission, in order to avoid saturation of the luminescent component or luminescent components after continued laser excitation. The optical coupling between the laser source and the optical may be a direct radiation from the laser source through air or vacuum, but may also include any suitable physical optical coupling means, for instance wave guides and optical reflectors. The optical element may have various forms. The reflector is preferably integrated with the optical element. Also, at least one laser and at least one optical element may be integrated. For instance, a bar of lasers may be coupled to a number of optical elements.

The luminescent materials are preferably fluorescent components. In particular, phosphors or phosphor mixtures are preferred, known for instance from the coatings in phosphor-converted light-emitting diodes. Examples of suitable fluorescent substances include: alkali earth metal borate halogen, alkali earth metal aluminates, oxynitrides or nitrides, sulfides, alkali earth thiogallate, alkali earth metal halogen appetite, germinate, rare earth aluminates, rare earth silicate, alkali earth silicates and alkali earth nitride silicates, luminescent organic compounds and organic complexes or the like which are primarily activated by lanthanides such as Eu. The luminescent material may be in the form of a transparent ceramic such as Ce-YAG. It may also be semi transparent or scattering. It may also be dispersed in a transparent material such as a polymer or glass.

The reflector may comprise any suitable light-reflecting materials, preferably non-absorbing materials as a multilayer dielectric stack, or diffuse reflectors such as aluminium oxide and/or titanium oxide, or combinations thereof. The emission window may have various forms, depending on the application. Advantageously, the optical element is provided with optical means for collimating or otherwise shaping the emitted light. Preferably, the optical element is a total internal reflection (TIR) element in order to maximize the amount of luminescent radiation emitted through the emission window.

Preferably, the surface of the emission window is essentially flat. The lighting device is suitable for use in various light projection devices, visual screens and automotive lighting applications and illumination.

In a preferred embodiment, the laser source is suitable for generating laser radiation with a wavelength less than 550 nm, preferably less than 450 nm, more preferably less than 370 nm. As 450 nm is at the high-energy end of the visible light spectrum (blue light), such light is easily employed to produce fluorescent radiation at wavelengths longer than 450 nm, in particular visible light. For the excitation of luminescent materials emitting at the low-energy end of the visible spectrum (red light), laser radiation between 450 and 550 nm is preferred, as this limits losses due to Stokes' shift effects and hence a more effective energy conversion compared to laser radiation at wavelengths shorter than 450 nm or shorter than 370.

It is preferred if the luminescent radiation emitted by luminescent material comprises visible light with a wavelength between 750 and 350 nm. Preferably, blue light of a wavelength shorter than 450 nm is used in order to produce visible luminescent radiation from suitable luminescent components. Preferably, the luminescent material is a ceramic phosphor material.

In a preferred embodiment, the device is provided with multiple optical elements. The optical elements may comprise the same type of luminescent material, and may be excited by the same laser source in a time-sequential or parallel manner.

It is preferred if at least part of the multiple optical elements comprise different luminescent components for the emission of luminescent radiance of different wavelengths. Hence, different colours may be projected.

Most preferably, the optical element comprises at least three different optical elements, wherein a first optical element comprises a luminescent material for the emission of red light, a second optical element comprises a luminescent material for the emission of green light, and a third optical element comprises a luminescent material for the emission of blue light. The device can easily be extended to other luminescent materials emitting e.g. in the cyan or yellow part of the spectrum. This can be used for improved colour representation in the case of projection and improved colour rendering in the case of illumination.

This RGB (red-green-blue) set-up enables the projection of RGB images. The optical elements may be excited by a single laser source, for instance by using an optical switch for directing the laser beam to the different spots in a sequential way.

In another preferred embodiment, a variation of the 3-spot RGB spot set-up as described above may be achieved by a device comprising at least one blue emitting laser at least one green optical element, at least one red emitting optical element and a non absorbing transparent or scattering optical element without luminescent material. The non-absorbing optical element does not convert the wavelength of the laser beam, but merely directs the blue laser light. The optical elements are scanned in a sequential manner by switching from the green element the red element, and the third non absorbing element that conveys laser own blue emission.

In yet another embodiment a green and a blue laser are used in combination with a red luminescent material. The position of the blue laser is kept constant while the green laser is switched between a non absorbing optical element where no conversion takes place and a red emitting optical element.

Preferably, the device comprises multiple laser sources, wherein each laser source is optically coupled to at least one optical element. Thus, it is relatively easy to address each of the optical elements in a controlled way.

It is preferred if at least one optical element is optically coupled to at least two different laser sources. Using multiple laser sources, a higher emitted radiation output can be achieved in a relatively easy way.

In a preferred embodiment, at least one laser source is optically coupled to the optical element through an optical switch arranged to switch the laser radiation between at least a first optical element and a second optical element. For instance in a 3-optical elements RGB set-up as described above, the laser may excite the blue, green and red optical elements in a sequential manner by pulsing to the first optical element, switching to the second optical element, and finally switching to the third spot. This sequence can be repeated, preferably at a frequency rate that allows for an image perceived as a full colour image by the human eye.

It is preferred if the optical switch comprises a reflector provided with displacement means for switching the direction of the reflected laser radiation. This provides a relatively simple means for switching the laser beam between several optical elements. The reflector may be selected from the group of optical components A mirror, a transparent birefringent or isotropic dielectric layer. A reflector mounted on a mechanical moving part can take care of the light deflection or displacement. The displacement means may comprise means suitable for vibrating motion, rotation, or a linear motion, and may be activated by mechanical means such as a motor, a galvanometer, a resonating MEM (micro-electromechanical) device, a displacement transducer, a solenoid, and/or a piezo element Such optical components are easy to employ and are capable of precisely directing the laser radiation to the intended spot, depending on the chosen switch position, with minimal loss of laser radiation intensity.

In another preferred embodiment, the optical switch comprises active non-moving components, in particular active polarization rotators, active polarizing beam splitters and/or passive beam splitters. The active means that under the influence of an electric field or mechanical means that the element is activated to induce the polarisation rotation or beam splitting effects. Preferred active element contain no moving parts and under the application of an electric field polarisation rotation action and or beam splitting action is realised. Such elements based on liquid crystals are well described in the literature. Pockels cells with no moving parts can also be used. The absence of moving parts has the advantage of a higher reliability. It is also possible to combine moving and non-moving parts to form an optical switch. In an other embodiment the laser source can also be moved mechanically.

Preferably, the ratio of the surface area of the emission window and the combined surface area of the luminescent material is between ⅙ and ½. Such optical devices produce emitted light at a high intensity, which is in particular useful for projectors.

It is preferred if the reflector has an essentially semi-spherical shape, wherein the emission window is defined by the essentially flat surface portion of the semi-spherical form. Such a shape allows for a high energy-density of the emitted radiation. Preferably, the surface area ratio of the surface area of the emission window and the combined surface areas of the emission window and the semi-spherical reflector is approximately ⅓.

It is preferred if at least one laser source is optically coupled to the optical element through a laser window, wherein the laser window is located away from the emission window. Thus, the laser radiation has minimal interference with the emitted radiation. The laser window for instance can be located opposite to the emission window with respect to the luminescent material. The window may be formed by an opening in a reflector layer. Laser windows and emitting windows are suitably coated in order to prevent unwanted reflections.

Advantageously, the laser window is arranged for directing of the laser radiation towards the luminescent material in a direction essentially perpendicular to the emission window. In such way, the optical path of the laser radiation is maximized and the chance of laser radiation escaping absorption by the luminescent material is minimized. In such a configuration the system may also contain a wave-guide.

Most preferably, the direction of the laser radiation is essentially perpendicular to the surface of the emission window. Hence, the chances of laser radiance escaping from the optical element is minimized by elongating the optical path and increasing the absorbance of the laser radiance by the luminescent material.

Advantageously, the emission window has a larger area than the laser window. This maximizes the amount of emitted luminescence reflected out of the optical element and minimizes losses by emitting through the laser window. Preferably, the laser window has an area is at least 100 times smaller than the emission window.

It is preferred if the laser window is provided with a dielectric reflector for selectively transmitting the laser radiation and reflecting the emitted radiation and the emission window is provided with a dielectric reflector for selectively reflecting the laser radiation and transmitting the emitted radiation. In this way, optimum use of the laser radiation is employed.

In a preferred embodiment, a transparent space lined with a reflective coating is provided between the laser window and the luminescent material. Such a transparent space may be air or a transparent material, and allows for a more efficient spreading the laser radiation over the available area of the luminescent material. Such spreading may be further increased by using scattering or diffracting plates, as well as a profiled surface of the luminescent material. The space may for instance be formed by a light guide, which is at least partially coated with a luminescent material.

In another preferred embodiment, at least one laser source is optically coupled to the luminescent material in the optical element through the emission window Thus, the same window can be used for the laser to enter the optical element and for the emitted radiation to leave the optical element. In such case, a part of the emission window actually acts as the laser window.

Preferably, at least one laser source is located at a distance from the optical element, wherein the laser source is optically coupled to the optical element through optical coupling means comprising at least one mirror element. Hence, it is possible to keep the laser source and the optical element at a mutual distance, which allows for easier heat management by applying cooling means to the laser source as well as the optical element.

In a preferred embodiment, the device is provided with projection means for projecting the emitted radiation. Projection means allow for the precise direction of the emitted radiation. Projection means may for instance include a projecting lens.

More preferably, the projection means comprise an image-forming element, in particular a digital micromirror device (DMD) or liquid crystal device such as LCOS (liquid crystal on silicon). Using an image-forming element through which the luminescent radiation is sent, very accurate images can be produced, for instance of TV broadcasts or movies.

The invention further provides an optical projector device, comprising data input means for the input of data to be projected, processing means for processing data from the input means, wherein the processing means are connected to at least one lighting device according to the invention, and an image-forming element suitably arranged to project the processed data. Such an optical projector, allows for a relatively compact set-up and projection of images at relatively high light intensities, and relatively low power consumption.

In a preferred embodiment, the lighting device comprises at least three optical elements, wherein a at least one laser is used to sequentially excite a red emitting optical element, a green-emitting optical element and a blue-emitting luminescent material to produce sequential RGB images in time which are observed by the human eye as a coloured image. Such a device is particularly suitably to project full-colour images, in particular TV broadcasts, movies and video games.

The invention also provides a method for projecting an optical image in RGB using a light device according to the invention, comprising the use of laser radiation to sequentially excite a red emitting optical element, a green-emitting optical element and a blue-emitting optical element to emit in a sequence red, green and blue radiation, and the use of the emitted radiation to produce sequential RGB images in time which are observed by the human eye as a coloured image.

BRIEF DESCRIPTION OF THE DRAWINGS

The invention will now be further explained using the following non-limiting embodiments.

DETAILED DESCRIPTION OF THE EMBODIMENTS

Figure 1:
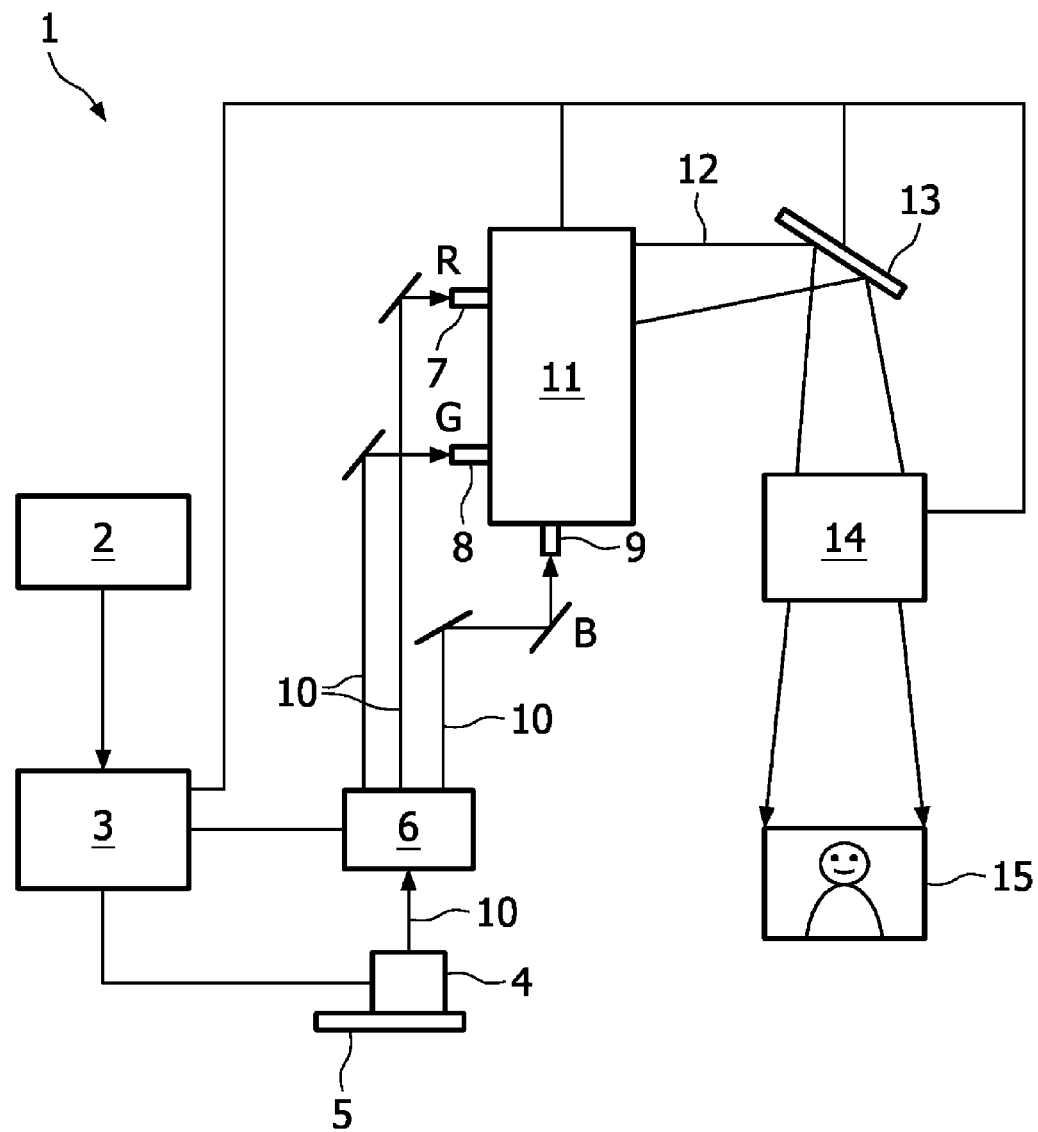
FIG. 1 shows a first embodiment of a projecting device according to the invention.

FIG. 1 shows an optical projector device 1, comprising image data input 2 (for instance a connection to a computer, internet or TV receiver) connected to processing and controlling means 3. The processing means process the data and controls the projection means in order to project the processed data. The projection means comprise a laser 4 cooled by a heat pipe 5 that is directed at an optical switch 6 operated by the processing means 3. The laser beam is a pulsed beam and comprises blue light with a wavelength of 450 nm or shorter. The optical switch 6 that switches the laser beam time-sequentially to locations comprising red (R), green (G) and blue (B) phosphors (7, 8, 9). The laser beam 10 time-sequentially excites the red, green and blue phosphors (7, 8, 9), leading to the emittance of red, green and blue visible light, respectively. Through a beam combiner device 11, the emitted visible light 12 is led through an image forming device such as a digital micromirror device 13 (DMD) or a liquid crystal on silicon device (LCOS) and a projecting lens 14, finally leading to a projected image 15, for instance on a wall or screen. The emitted visible light is typically composed mostly by emitted light with wavelengths between 750 nm and 350 nm. The projected image 15 is built up from the red, green and blue images emitted by the red, green and blue phosphors 7,8,9, that are emitted in a sufficiently fast time-sequential manner to ensure the projected image is perceived as a full-colour image.

Figure 2:
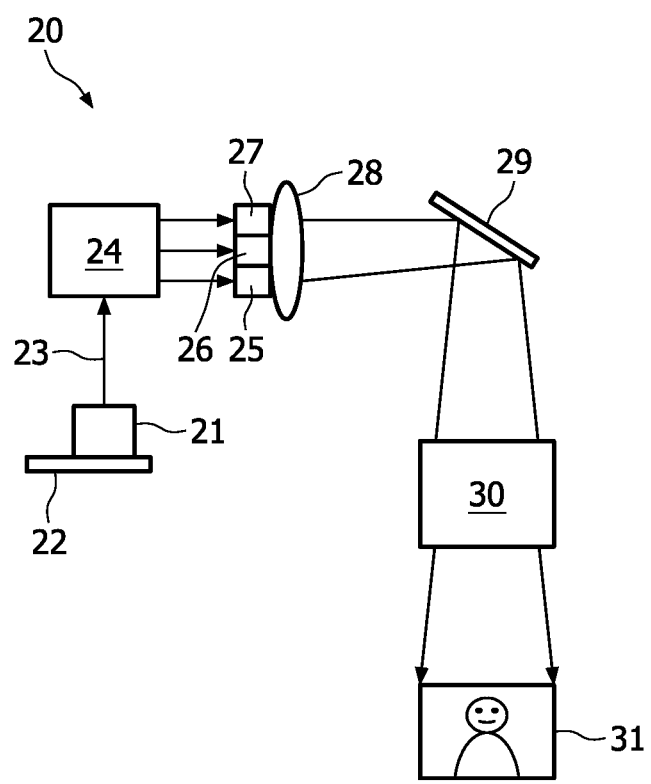
FIG. 2 shows a second embodiment of a projecting device according to the invention.

FIG. 2 shows another embodiment of the invention, comparable to the device according to FIG. 1. The lighting device 20 comprises a laser 21 provided with cooling means 22, sending a laser beam 23 through an optical switch 24 sending the laser beam to either a red, green or blue phosphor-containing luminescent elements 25, 26, 27, in a time-sequential manner. The luminescent elements 25, 26, 27 are integrated in an optical element 28 arranged to direct the emitted light from the luminescent elements 25 to a digital micromirror device 29 (DMD) and a projector lens 30 in order to achieve a projection 31.

Figure 3A:
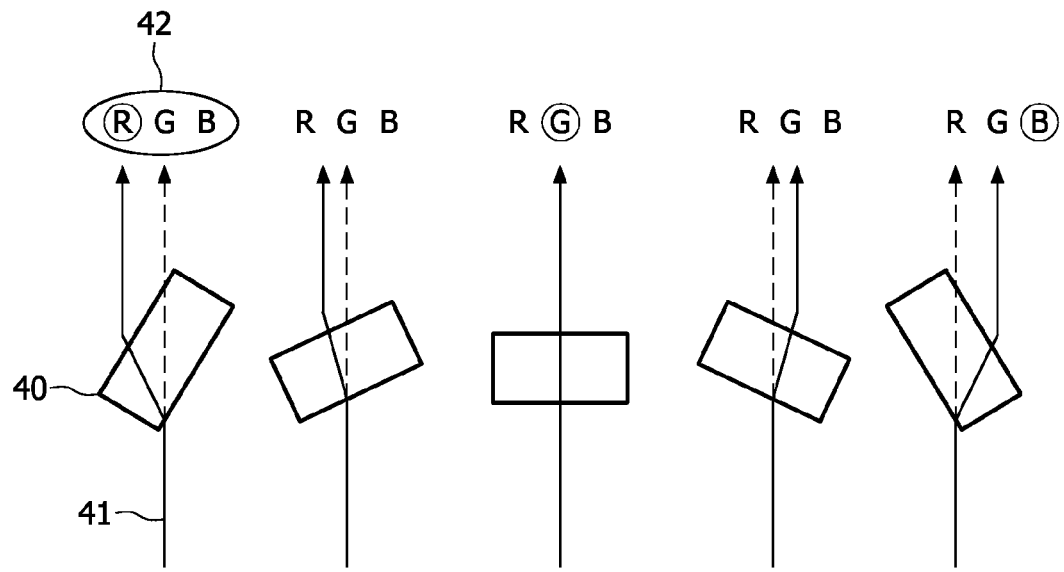
FIGS. 3*a-c* show examples of optical switches that may be employed in a projecting device according to the invention.

Various types of optical switches may be employed in a projector system according to the invention, in order to make the laser radiation time-sequentially excite the light-emitting optical elements of different colours, comprising red, green and blue luminescent materials, respectively. A preferred optical switch may be a vibrating or rotating transparent dielectric element 40, shown in FIG. 3*a*. From left to right, various orientations of the rotating transparent dielectric element 40 (preferably a glass element) with respect to the laser beam 41 are shown, directing the laser beam 41 selectively towards any one of the available luminescent materials 42. In the left-most position, the laser beam is directed to excite a red ceramic phosphor material denoted R. Going to further rotating orientations, the middle orientation directs the laser beam to a green phosphor material (G), whereas the rightmost orientation directs the beam towards a blue phosphor material (B). The encircled letter R, G or B denotes the excited phosphor dot. In the intermediate positions, none of the phosphor dots (R, G, B) are excited by the laser beam. By adjusting the speed of movement of the switch and/or the pulse duration of the laser beam at a certain position the luminescence intensity of the luminescent materials can be controlled.

Figure 3B:
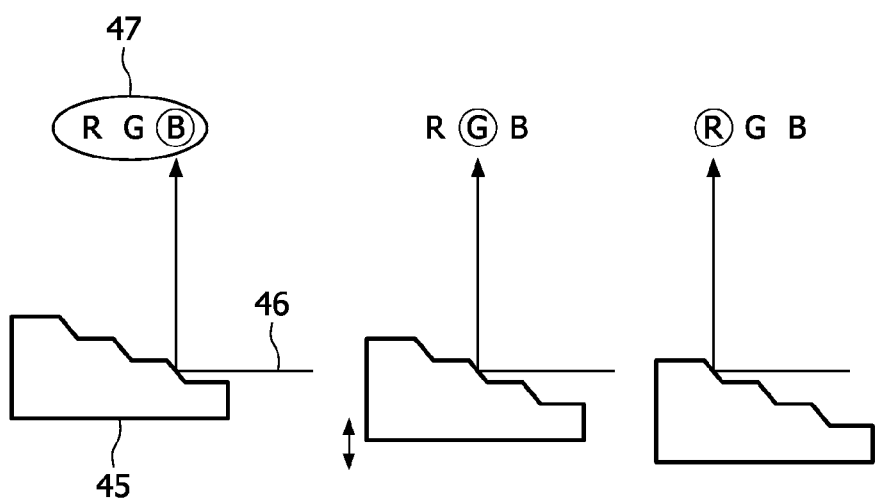

Another way of displacing the position of the laser in a rotation action is to use a displaceable mirror 45 as shown in FIG. 3*b*. The tapered mirror 45 is displaced vertically in an essentially linear fashion with respect to the laser beam 46, enabling the selective excitement of the red, green or blue phosphor-containing optical elements 47 (R, G, and B, respectively) depending on the position of the mirror. For linear displacement of the mirror one can may for instance use transducers, solenoids etc. Alternatively, a parabolic mirror may be used instead of the tapered mirror 45, using a rotating movement to direct the laser beam 46 to the selected luminescent material 47 (not shown in FIG. 3b). In addition to the methods above where the laser beam has a parallel movement, angular scans of a laser beam may also be used.

Figure 3C:
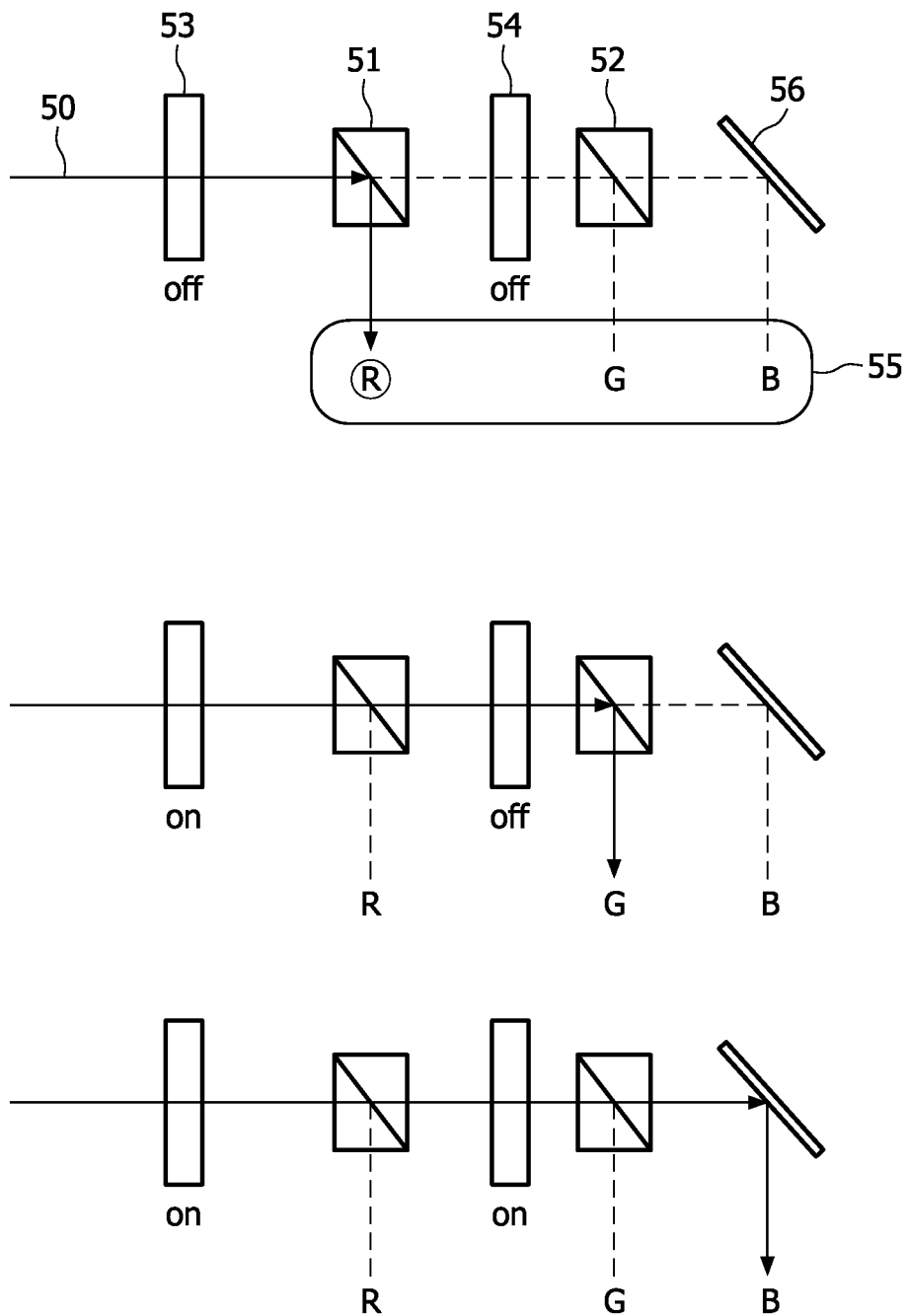

The methods described above in FIGS. 3a and 3b involve moving parts. However one can also make use of polarized nature of laser radiation and combine it with polarizing passive optical components and active polarization rotators such a liquid crystal cells. FIG. 3c shows schematically how the position of a laser beam 50 can be changed using polarizing beam splitters (PBS) 51, 52 and switchable polarization rotators 53, 54 at different states, in order to selectively excite any one of the red, green or blue luminescent materials 55. In the top situation, both rotators 53, 54 are switched off, and the laser beam 50 is reflected by the first polarizing beam splitter 51 and directed towards the red (R) luminescent optical element. In the middle situation, the first rotator 53 is turned on, rotating the polarization such that the laser beam 50 passes the first beam splitter 51 as well as the second rotator 54 that is turned off. The second polarizing beam splitter 52 reflects the laser beam 50 towards the green (G) luminescent material. In the lower configuration, both the first and second rotators 53, 54 are turned on, causing the laser beam 50 to pass both the first and second beam splitters 51, 52. Finally, the beam 50 is reflected by a reflector 56 towards the blue (B) luminescent material. Thus, it is very easy to control the exact single luminescent material 55 to be excited by the laser beam 50. Of course, the technology presented here may be varied and combined with known optical technology.

Figure 4A:
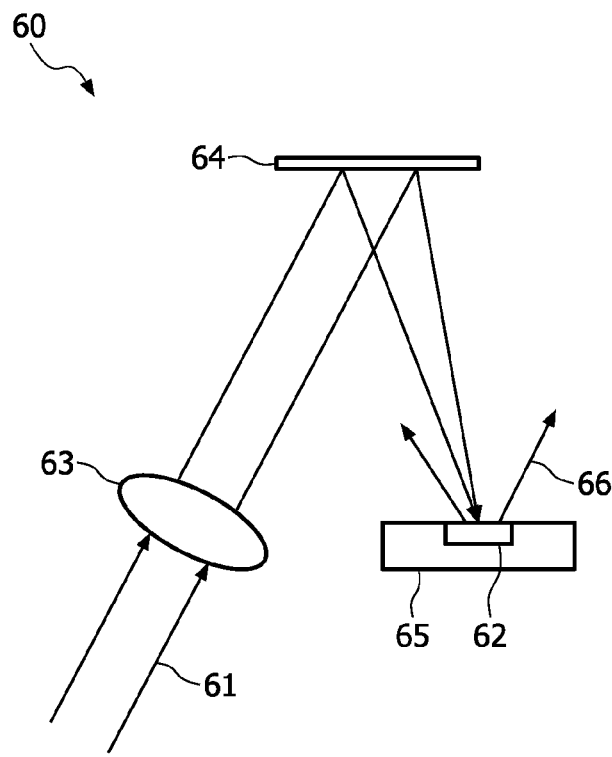
FIGS. 4*a* and 4*b* show optical elements that may advantageously be employed in a projecting device according to the invention.

The luminescent materials to be excited by the laser beam may be excited selectively using optical switches such as those presented above. The laser beam may then follow various pathways to arrive at the selected luminescent material. For instance, FIG. 4a shows a device 60 wherein the laser beam 61 (or multiple combined laser beams if more than one laser source is used simultaneously) are directed at the selected luminescent spot 62 (for instance a red, green or blue phosphor) using at least one lens 63 and at least one mirror 64 to yield laser radiation converging at the luminescent spot 62. The luminescent spot 62 is embedded in a reflective material 65, causing a convergent the luminescent radiation 66 emitted by the optical element. Such a set-up may be highly useful for instance in automotive lighting devices.

Figure 4B:
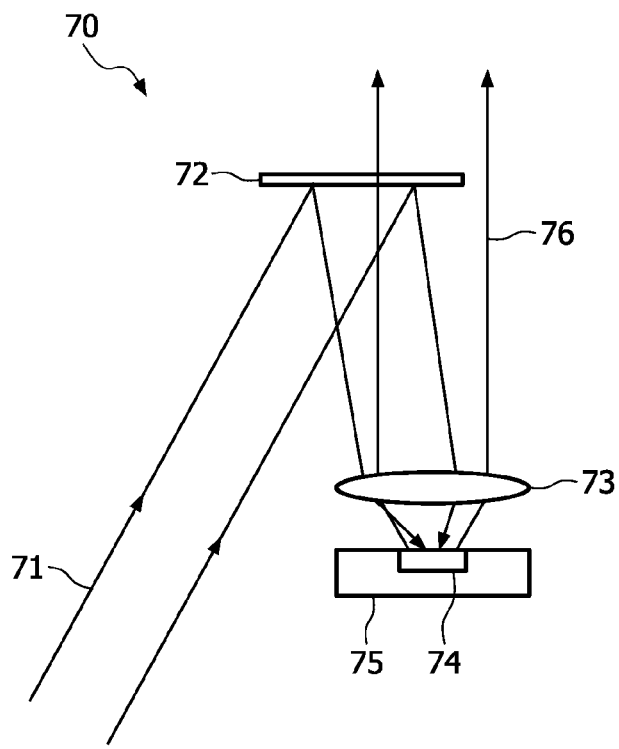

FIG. 4b shows another device 70 wherein the laser beam 71 is reflected by a mirror 72 through a lens 73 onto a luminescent spot 74 embedded in a reflective coating 75, wherein the emitted luminescent radiation 76 is emitted through the same lens 73 as a collimated beam, which is relatively easy to control by further optical means. In this situation, the emission window is the same lens 73 as the lens through which the laser beam enters the optical element comprising the luminescent spot 74.

Figure 5A:
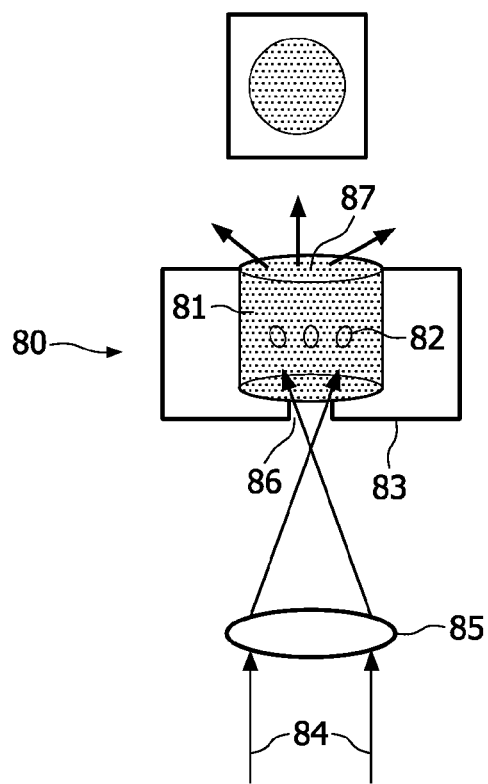
FIGS. 5*a-c* show optical elements that may be employed in a projecting device according to the invention.

FIG. 5a shows a device 80 wherein a cylindrical optical element 81 comprising a luminescent material 82 (for instance red, green or blue phosphor materials) is embedded in a reflective coating 83. The luminescent dots 82 are irradiated by a laser beam 84 concentrated by a lens 85 through a laser window 86 with a relatively small surface area. Upon excitation by the laser beam 84, the luminescent dots 82 emit light of a longer wavelength (for instance red green and/or blue radiation), primarily through the emission window 87 that has a larger surface area than the laser window 86.

Figure 5B:
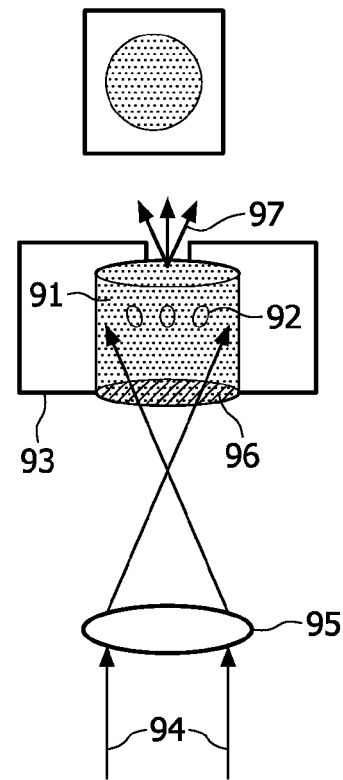

FIG. 5b shows a situation comparable to FIG. 5a, however here the emission window 97 has a smaller surface area than the laser window 96 through which the laser beam 94 enters the optical element 91 comprising the luminescent material 92. Instead of a cylindrical optical element 92, optical elements with different shapes may also be used. Optionally, the laser window 96 may have a reflector which selectively transmits the laser wavelength but reflects the emitted wave length from the luminescent material. Also optionally, the emission window 97 may be coated with a reflector selectively reflecting the laser beam 94 wavelength but transmitting the wavelength of the light emitted from the luminescent material 92.

Figure 5C:
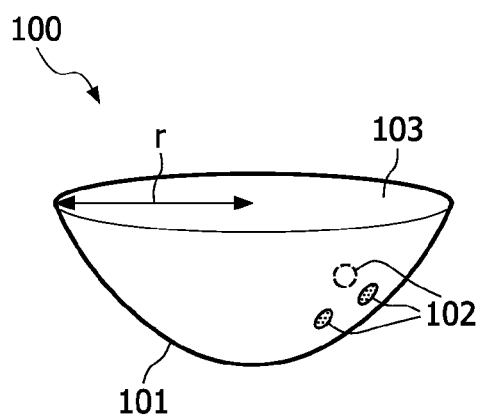

FIG. 5c shows an advantageous optical element 100 for use in devices according to the invention. The optical element 100 has a semi-spherical shape coated with a reflective coating 101 on the curved surface and luminescent particles 102 of a predetermined colour, dispersed in a optically transparent, non-absorbing material. The emission window 103 is flat and has a radius r, and has a surface area that amounts up to approximately ⅓ of the total surface area of the optical element 100. The luminescent particles 102 may be excited by a laser beam entering through the emission window 103, or by a laser window or multiple laser windows created in the reflective coating 101.

Figure 6A:
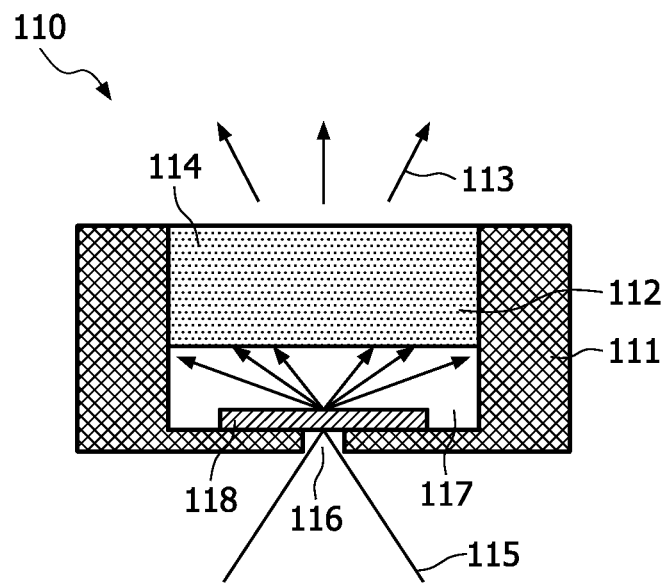
FIGS. 6*a-c* show further embodiments of optical elements that may be used in a projecting device according to the invention.

FIG. 6a shows an optical element 110, comprising a reflector 111 wherein a luminescent material 112 is embedded, emitting luminescent radiation 113 through a emission window 113 upon excitation by laser radiance 115 entering the optical element 110 through a laser window 116. Between the laser window 116 and the luminescent material 112 a transparent zone 117 is located. The transparent zone 117 may contain air or another transparent gas, but is preferably made of a transparent heat conducting solid material. The transparent zone 117 is lined by the reflector 111, allowing the laser radiation 115 to spread through reflections and be absorbed by the luminescent material 112. Optionally, the laser window 116 is provided with a beam expander 118, for instance a diffracting or scattering material, or another beam broadening element, in order to provide a better efficiency in the absorbance of the laser radiation 115.

Figure 6B:
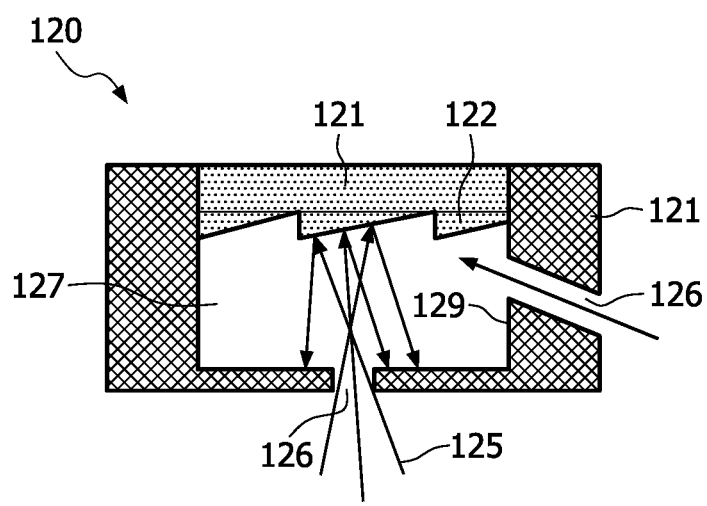

FIG. 6b shows an optical element 120 comparable to the optical element 110 in FIG. 6a, wherein a surface of the luminescent material 122 in contact with the transparent zone 127 is provided with a profiled surface arranged in order to reflect laser radiation 125 away from the laser window 126, and to increase the laser absorbing surface. The emission window 121 is essentially flat. Optionally, laser window may be located at a face 129 of the reflector adjacent to the emission window 121, directed essentially perpendicular to the surface of the emitting window.

Figure 6C:
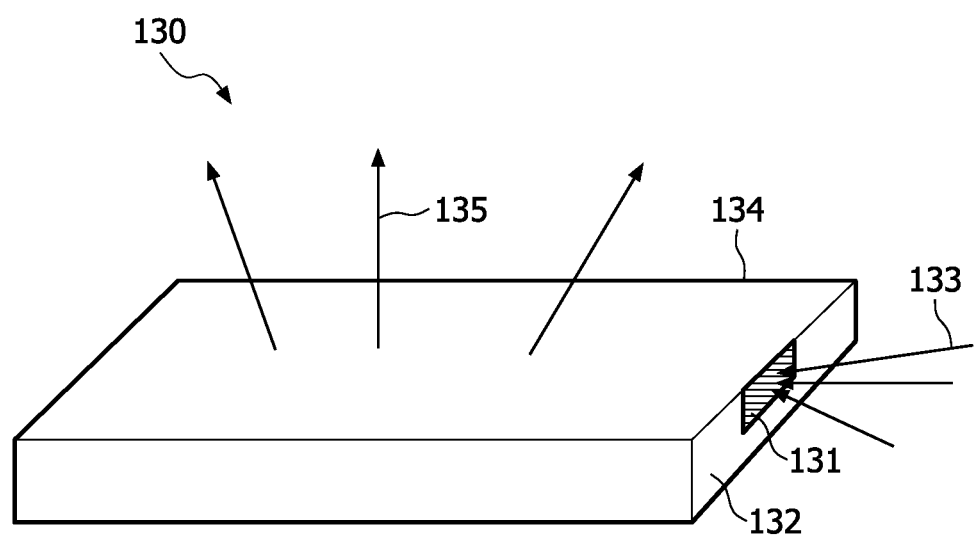

FIG. 6c shows another preferred embodiment of an optical element 130 according to the invention, wherein a transparent zone 131 forms a channel within a reflector 132, and a layer of luminescent material 134 is positioned on top of this channel 131. Laser radiance 133 is directed into the channel 131 and after internal reflections is absorbed by the luminescent material 134 to emit visible light 135 outwards.

The invention can also be used for general illumination purposes if different optical elements for light distribution are taken in combination with a laser source.

The invention claimed is:
1. A lighting device, comprising:
at least one laser source for generating laser radiation;
a plurality of optical elements; and
an optical switch configured to switch the laser radiation between at least two of the plurality of optical elements, wherein each of the optical elements includes:
  a solid exterior surface defining an internal volume of the optical element,
  a light emission window disposed on the exterior surface, at least one luminescent material for emitting luminescent radiation upon excitation by the laser radiation, and a reflective coating disposed on at least a portion of one surface of the optical element for directing the emitted luminescent radiation from the luminescent material through the light emission window, wherein at least one of the laser radiation and the emitted luminescent radiation traverses at least a portion of the internal volume, wherein at least two optical elements of the plurality of said optical elements comprise different luminescent materials for the emission of luminescent radiation of different wavelengths, wherein the optical element has a cylindrical shape, wherein the at least one luminescent material is provided on a curved portion of the surface of the optical element having the cylindrical shape and wherein the emission window is defined by an essentially flat surface portion of the optical element having the cylindrical shape.

2. The lighting device of claim 1 wherein the luminescent material is a ceramic phosphor material.

3. The lighting device of claim 1 wherein the plurality of said optical elements comprises at least three different optical elements, wherein
a first optical element comprises a luminescent material for the emission of red light,
a second optical element comprises a luminescent material for the emission of green light, and
a third optical element comprises a luminescent material for the emission of blue light.

4. The lighting device of claim 3, wherein the device comprises multiple laser sources, wherein each laser source is optically coupled to at least one optical element.

5. The lighting device of claim 3, wherein at least one optical element is optically coupled to at least two different laser sources.

6. The lighting device of claim 1, wherein the optical switch comprises a laser reflector provided with displacement means for switching the direction of the reflected laser radiation.

7. The lighting device of claim 6, wherein the optical switch comprises active non-moving components, including active polarization rotators, active polarizing beam splitters and/or passive beam splitters.

8. The lighting device of claim 1, wherein the optical element defines a laser window for entry of the laser radiation, wherein the laser window is located away from the emission window.

9. The lighting device of claim 8, wherein the laser window is arranged for directing of the laser radiation towards the luminescent material in a direction essentially perpendicular to the emission window.

10. The lighting device of claim 8, wherein the emission window has a larger area than the laser window.

11. The lighting device of claim 8 wherein the optical element includes a dielectric reflector disposed at the laser window for selectively transmitting the laser radiation and reflecting the emitted radiation.

12. The lighting device of claim 1, wherein the at least one laser source is located at a distance from the optical element, wherein the laser source is optically coupled to the optical element through optical coupling means comprising at least one mirror element.

13. The lighting device of claim 1, wherein the device is provided with projection means for projecting the emitted radiation.

14. The lighting device of claim 13, wherein the projection means comprise an image-forming element.

15. A lighting device, comprising:
at least one laser source for generating laser radiation;
a plurality of optical elements; and
an optical switch configured to switch the laser radiation between at least two of the plurality of optical elements,
wherein each of the optical elements includes:
a solid exterior surface defining an internal volume of the optical element,
a light emission window disposed on the exterior surface,
at least one luminescent material for emitting luminescent radiation upon excitation by the laser radiation, and
a reflective coating disposed on at least a portion of one surface of the optical element for directing the emitted luminescent radiation from the luminescent material through the light emission window, wherein at least one of the laser radiation and the emitted luminescent radiation traverses at least a portion of the internal volume, wherein at least two optical elements of the plurality of said optical elements comprise different luminescent materials for the emission luminescent radiation of different wavelengths, wherein the optical element has a semi-spherical shape, wherein the at least one luminescent material is provided on a curved portion of the surface of the optical element having the semi-spherical shape and wherein the emission window is defined by an essentially flat surface portion of the optical element having the semi-spherical shape.

16. The lighting device of claim 15, wherein the plurality of said optical elements comprises at least three different optical elements, wherein
a first optical element comprises a luminescent material for the emission of red light,
a second optical element comprises a luminescent material for the emission of green light, and
a third optical element comprises a luminescent material for the emission of blue light.

17. The lighting device of claim 16, wherein the device comprises multiple laser sources, wherein each laser source is optically coupled to at least one optical element.

18. The lighting device of claim 15, wherein at least one optical element is optically coupled to at least two different laser sources.

19. The lighting device of claim 15, wherein the optical element defines a laser window for entry of the laser radiation, wherein the laser window is located away from the emission window.

20. The lighting device of claim 15, further comprising projection means for projecting the emitted radiation.

* * * * *